United States Patent
Avati et al.

(10) Patent No.: US 10,120,868 B2
(45) Date of Patent: Nov. 6, 2018

(54) OUTCAST INDEX IN A DISTRIBUTED FILE SYSTEM

(71) Applicant: Red Hat, Inc., Raleigh, NC (US)

(72) Inventors: Anand Vishweswaran Avati, Mountain View, CA (US); Pranith Kumar Karampuri, Jeedimetla (IN)

(73) Assignee: Red Hat, Inc., Raleigh, NC (US)

( * ) Notice: Subject to any disclaimer, the term of this patent is extended or adjusted under 35 U.S.C. 154(b) by 288 days.

(21) Appl. No.: 14/178,089

(22) Filed: Feb. 11, 2014

(65) Prior Publication Data

US 2015/0066855 A1 Mar. 5, 2015

Related U.S. Application Data

(60) Provisional application No. 61/873,750, filed on Sep. 4, 2013.

(51) Int. Cl.
| | |
|---|---|
| *G06F 7/00* | (2006.01) |
| *G06F 17/00* | (2006.01) |
| *G06F 17/30* | (2006.01) |

(52) U.S. Cl.
CPC .............. *G06F 17/30094* (2013.01)

(58) Field of Classification Search
CPC ............ G06F 17/30212; G06F 17/30094

USPC .......................................... 707/637
See application file for complete search history.

(56) References Cited

U.S. PATENT DOCUMENTS

| | | | |
|---|---|---|---|
| 2004/0148317 A1* | 7/2004 | Sundararajan | G06F 17/30581 |
| 2006/0206901 A1* | 9/2006 | Chan | G06F 9/524 |
| | | | 718/107 |
| 2007/0156842 A1* | 7/2007 | Vermeulen | G06F 17/30212 |
| | | | 709/217 |
| 2007/0198599 A1* | 8/2007 | Tobies | G06F 17/30377 |
| 2009/0063486 A1* | 3/2009 | Oza | G06F 9/526 |
| 2013/0031321 A1* | 1/2013 | Shinozaki | G06F 11/2064 |
| | | | 711/162 |
| 2015/0120658 A1* | 4/2015 | Rath | G06F 17/30575 |
| | | | 707/623 |

* cited by examiner

*Primary Examiner* — Van Oberly
(74) *Attorney, Agent, or Firm* — Womble Bond & Dickinsln (US) LLP; Daniel Ovanezian

(57) ABSTRACT

An outcast index in a distributed file system is described. A first server can receive an indication that a first replica stored on the first server is to be modified in view of a second replica stored on a second server. The first replica and the second replica are replicas of a same file. The first server updates metadata associated with the first replica to indicate an outcast state of the first replica. The first server receives an indication that the modification of the first replica is complete. The first server updates the metadata associated with the first replica to remove the outcast state of the first replica.

14 Claims, 4 Drawing Sheets

_US 10,120,868 B2_

OUTCAST INDEX IN A DISTRIBUTED FILE SYSTEM

CROSS-REFERENCE TO RELATED APPLICATION

This application is related to and claims the benefit of U.S. Patent Application No. 61/873,750, filed Sep. 4, 2013, the entirety of which is incorporated herein by reference.

TECHNICAL FIELD

The present disclosure relates to a distributed file system, and more particularly, to an outcast index in distributed file systems.

BACKGROUND

Data may be stored as unstructured data, for example, in files and directories in a file system. A distributed file system may store multiple copies ("replicas") of a file and/or directory on more than one storage server machine to help ensure that, in case of a hardware failure and/or system failure, the data is still be accessible. If a storage server machine experiences a failure, the storage server machine may be unavailable, but changes can still be made to the replicas on the available storage server machines. The replica on the storage server machine that is down may be stale, i.e., no longer have a current version of the data. When the failed storage server machine is powered back up, the changes which were made to the other replicas should be propagated to the replica on the failed storage server machine. The replica on the failed storage server machine can be referred to as a target replica, and an up-to-date replica used for propagating changes can be referred to as a source replica. Because the target replica is out-of-date, it should not be used as a source replica to update any other replica.

The propagation of changes can take some time. For example, when a replica being repaired is a copy of a large virtual machine image file, the repair process may take several minutes. During the repair process, the storage server machine hosting the source replica can become unavailable (e.g., can go down or become disconnected from the network) before the update of the target replica is complete. As a result, the target replica can be out-of-date, which can cause data loss and/or create problems with data consistency in the distributed file system (e.g., if the target replica is used to repair another replica).

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
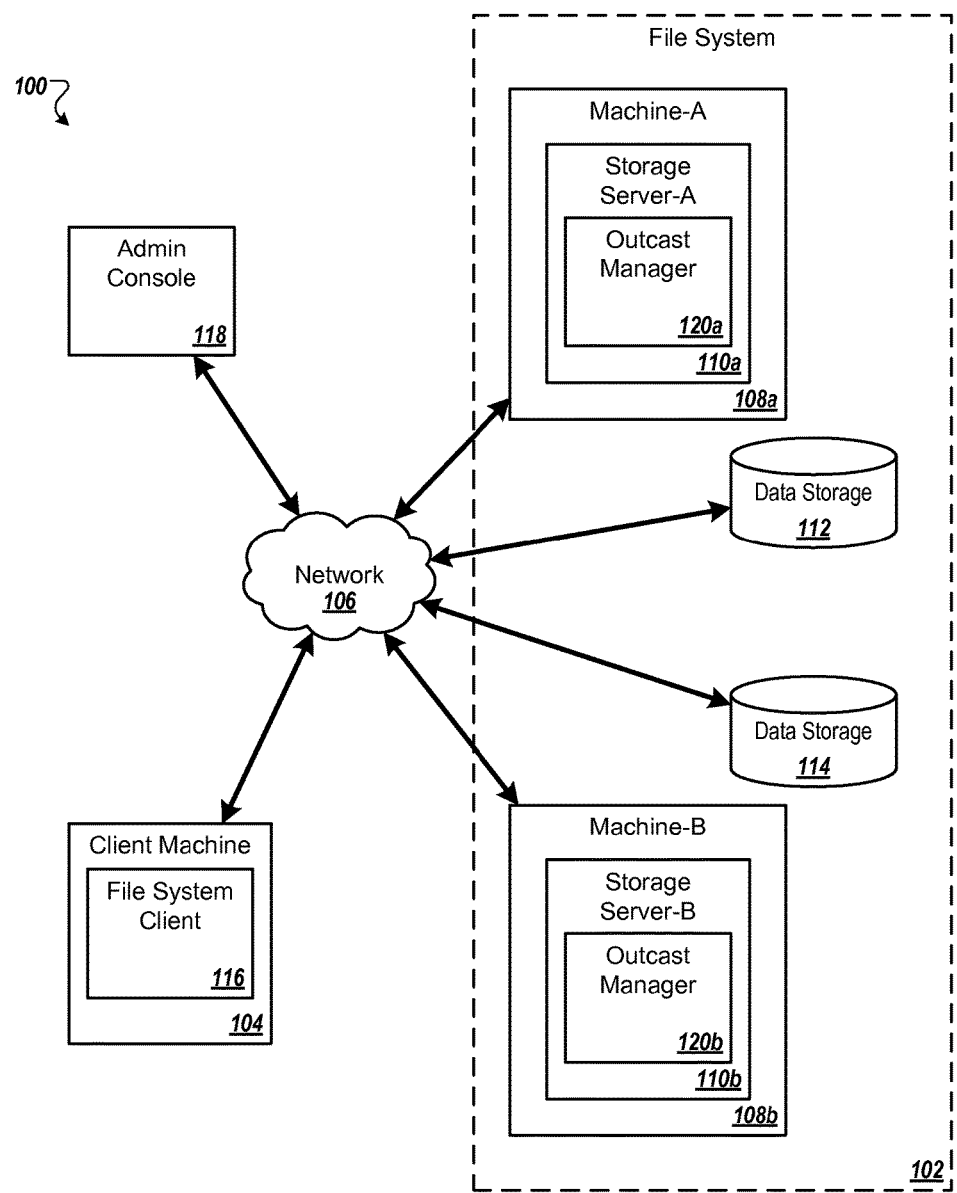
FIG. 1 is an example system architecture 100 for various implementations.

Described herein are a method and apparatus for recording and detecting an out-of-date state of a replica in a distributed file system.

A distributed file system may include several servers storing replicas of file X (e.g., a virtual machine image file). For example, server A may store replica 1 of file X, server B may store replica 2 of file X and server C may store replica 3 of file X. If server B goes down and is then powered back up, any changes which were made to replica 1 on server A while server B was down should be propagated to replica 2 on server B. Further, replica 2 on server B should not be used to repair any of the other replicas since it is out-of-date.

During a process to repair or heal replica 2 on server B, server A can track the progress of changes, and when the repair process is completed, it can notify server B. However, if server A becomes unavailable (e.g., goes down or becomes disconnected from the network) during the repair process (i.e., before the repair process is complete), replica 2 can be only partially updated (i.e., it is still in an out-of-date state). With conventional systems, this may not be known to servers B and C, which can subsequently use replica 2 to repair replica 3, resulting in loss of data of file X.

Aspects of the present disclosure address the above problems by recording an out-of-date state of a replica, which is referred to herein as an outcast state. In the example above, each server may store metadata representing the state of its own replica and the state of each other replica within the distributed file system. That is, server A may store metadata A1 representing the state of its own replica (replica 1), metadata B1 representing the state of replica 2, and metadata C1 representing the state of replica 3. Server B may store metadata B2 representing the state of its own replica (replica 2), metadata A2 representing the state of replica 1, and metadata C2 representing the state of replica 3. Similarly, server C may store metadata C3 representing the state of its own replica (replica 3), metadata A3 representing the state of replica 1, and metadata B3 representing the state of replica 2. In implementations, the metadata is broadcast by a server that initiates any operation to a replica.

FIG. 1 is an example system architecture 100 for various implementations. The system architecture 100 can include a distributed file system 102 coupled to one or more client machines 104 via a network 106. The network 106 may be a public network, a private network, or a combination thereof. The distributed file system 102 can be a network attached storage file system that includes one or more machines 108A-B and one or more mass storage devices, such as magnetic or optical storage based disks 112,114, solid-state drives (SSDs) or hard drives, coupled to the machines 108A-B via the network 106. The machines 108A-B can include, and are not limited to, any data processing device, such as a desktop computer, a laptop computer, a mainframe computer, a personal digital assistant, a server computer, a handheld device or any other device configured to process data.

The distributed file system 102 can store data as files and can include directories, which are virtual containers within the file system 102, in which groups of files and possibly other directories can be kept and organized. The machines 108A-B can include storage servers 110A-B to manage the files and directories in the data stores 112, 114 for a corresponding storage server 110A-B. The data stores 112, 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

One or more client machines 104 can include a file system client 116 to communicate with the storage servers 110A-B in the file system 102. Examples of file system clients 116 can include, and are not limited to, native file system clients and network file system (NFS) clients. "Native" can describe support for specific operating systems. For example, a native file system client may be, and is not limited to, a file system client that supports the Linux operating system. The file system client 116 can mount the file system 102 via a mount point to access the data in the file system 102.

When the file system client 116 requests a file from the file system 102, the file system client 116 may be directed to a specific copy (replica) of that file on one of the storage servers 110a-b, and can check metadata associated with the replica to determine if the replica is in an outcast state.

Each server 110 can have an outcast manager 120 that records an outcast state of a replica. For example, when storage server A 110a starts a repair process of replica 2 from server A, server A acquires a lock of replica 2 and informs outcast manager 120b on server B that the repair process has started. Outcast manager 120b updates metadata B2 of replica 2 to indicate the outcast state of replica 2. Subsequently, file system client 116 can request replica 2 and invoke outcast manager 120b to determine the state of replica 2. If outcast manager 120b determines that metadata B2 indicates that replica 2 in an outcast state, outcast manager 120b can further check to see if replica 2 has a pending lock. If so, outcast manager 120b determines that the repair process is still in progress. If not, outcast manager 120b determines that the repair process has ended abnormally and replica 2 is out-of-date, which may require replica 2 to be repaired from replica C or another source. The repair process can be initiated, for example, in response to a client request for a file as discussed above, in response to a repair request from a user or system administrator (e.g., via an admin console 118), when a storage server detects that another server went down and then came back up, etc.

In one embodiment, metadata of each replica is represented by a bitmap, with each bit in the bitmap indicating whether a corresponding portion of that replica has been recently modified (e.g., "0" for unmodified, and "1" for modified). When replica 2 is getting repaired from replica 1, server 110a can look at a bitmap A1 to see what portions of replica 1 were changed, and propagates those changes to respective portions of replica 2. The repair process can be initiated automatically (e.g., when server 110b goes down and then comes back up, or when a client 104 requests a file from a server and checks bitmaps of the file's replicas to see if the replica stored on that server is current), or upon a user request.

In some embodiments, once the repair process of replica 2 starts, bitmap B2 on server B is modified to provide an indication of the outcast state of replica 2. This indication may be provided by, for example, setting all bits of bitmap B2 to 1, or to some other values, which provide a unique combination ("outcast index") indicating the outcast state. While replica 2 is being repaired, server A can update bits of bitmap B1 on server A to indicate a count of missed updates and/or specify what portions of replica 2 have been repaired. Once the repair of the entire replica 2 is complete, bitmap B2 on server B is replaced with bitmap B1, thereby removing the outcast state of replica 2. If the repair of replica 2 has not completed (e.g. due to problems with server A), bitmap B2 on server B indicates the outcast state of replica 2, which means that replica 2 is out-of-date and cannot be used by clients and/or as source of repair for other replicas (e.g., replica 3).

Figure 2:
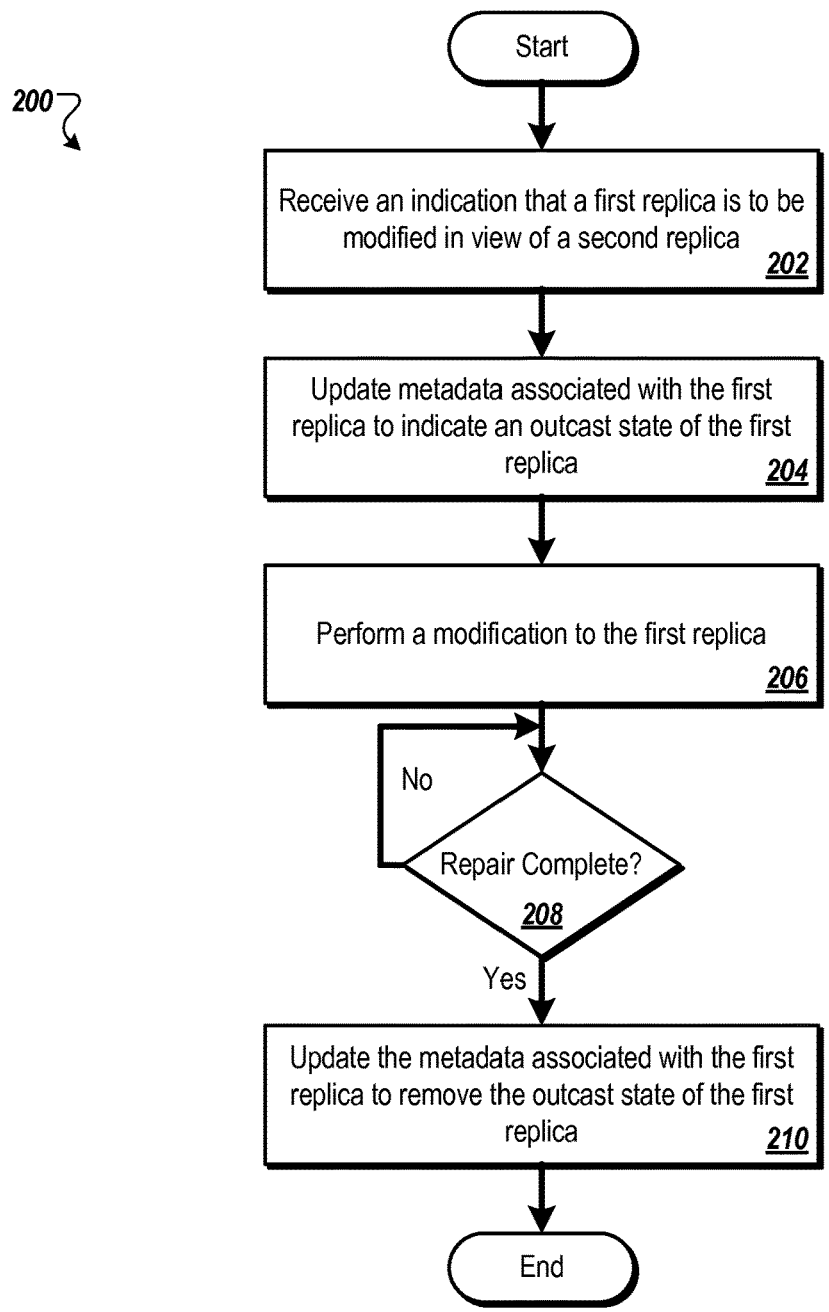
FIG. 2 is a flow diagram of a method for repairing a replica in a distributed file system in accordance with some implementations.

FIG. 2 is a flow diagram of a method 200 for repairing a replica in a distributed file system in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 200 is performed primarily by client machine 104 of FIG. 1. In other implementations, method 200 is performed primarily by a storage server 110 of FIG. 1. For clarity of presentation, the description that follows uses the system 100 as examples for describing the method 200. However, another system, or combination of systems, may be used to perform the method 200.

Referring to FIG. 2, in one implementation, method 200 begins at block 202 where the processing logic receives an indication that a first replica is to be modified in view of a second replica. The first replica can be stored on a first server and the second replica can be stored on a second server. In some implementations, the modification is a repair or is part of a self-heal process. At block 204, the processing logic updates metadata associated with the first replica to indicate an outcast state of the first replica. In implementations, the metadata includes a bitmap that the processing logic can update, as described herein. At block 206, the processing logic receives an indication that the modification of the first replica is complete, such as from a server associated with the first replica. Once the processing logic determines that the repair of the first replica is complete at block 208, the processing logic updates the metadata associated with the first replica to remove the outcast state of the first replica at block 210. The first replica is now up-to-date and can be used to repair or create other replica files.

Figure 3:
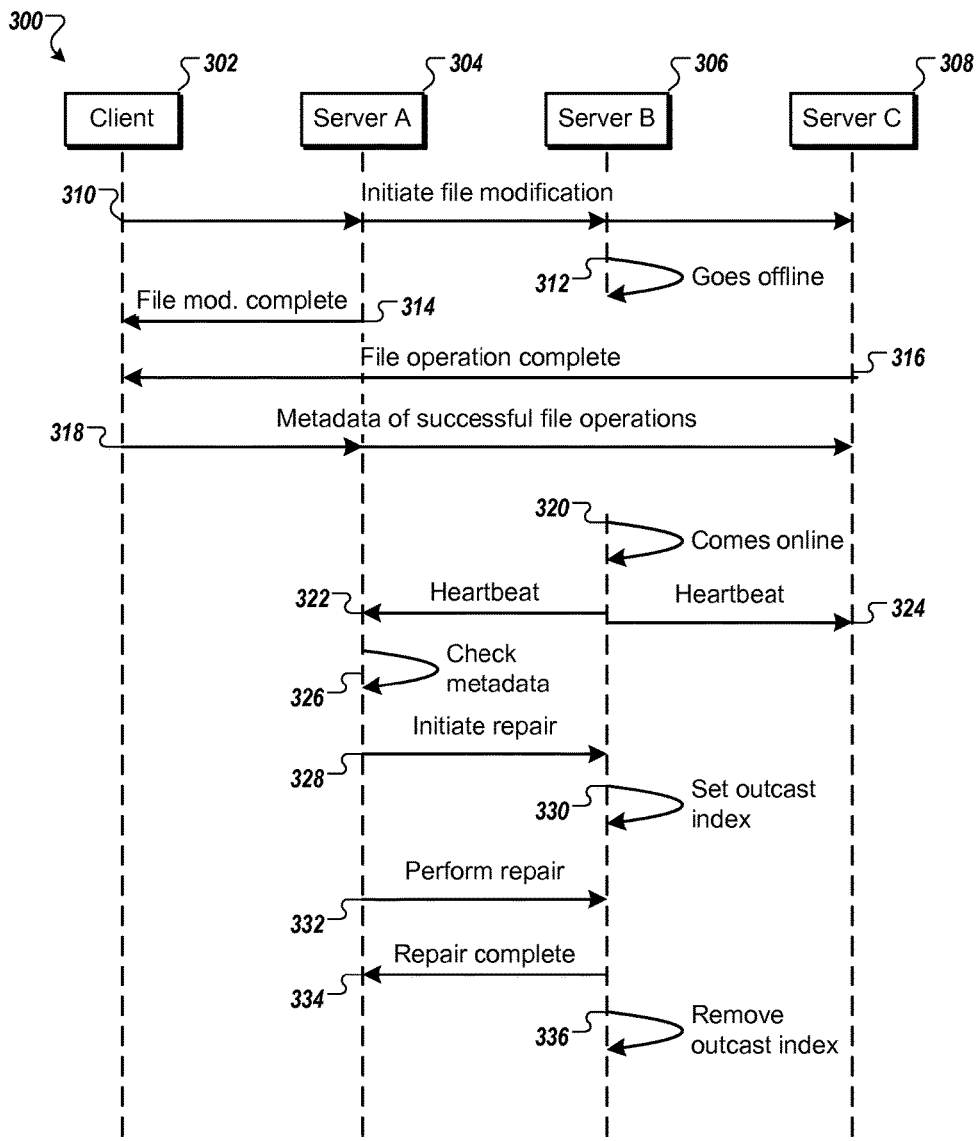
FIG. 3 illustrates a sequence diagram for self-healing in a distributed file system 300 in accordance with implementations.

FIG. 3 illustrates a sequence diagram for self-healing in a distributed file system 300 in accordance with implementations. The distributed file system can include any number of servers (e.g., server A 304, server B 306, server C 308) and can be accessed by a client 302.

In FIG. 3, at 310 the client 302 can initiate an operation to a file (e.g., write, modify, truncate, delete) that is replicated among multiple servers 304, 306, 308 within the distributed file system 300. In implementations, the client 302 can initiate a lock of each replica on each of the servers. In some implementations, the client 302 can lock a portion (e.g., a portion to be modified) of each of the replicas. In some implementations, the client 302 can update, via metadata, the nature of the operation and then communicate the metadata to each of the servers 304, 306, 308 within the distributed file system 300.

At 312, server B 306 goes offline before the file operation is complete. Server A 304 and server C 308 remain online and perform the file operation as instructed by client 302. At 314, server A 304 indicates to the client 302 that the file operation is complete. Similarly, at 316, server C 308 indicates to the client 302 that the file operation is complete. The client 302 creates or updates metadata that indicates that the file operation was performed at server A 304 and at server C 308. The client 302 can create a report of which operations were successful and which operations were not. At 318, the client 302 communicates the metadata associated with the file operation to online servers 304 and 308. In this example, server B 306 is offline and may not receive the metadata from client 302. At 320, server B 306 comes back online. Client 302 can also unlock of each replica on each of the servers.

In an implementation, the distributed file system 300 implements a heartbeat mechanism among the servers within the distributed file system 300. All servers within the distributed file system 300 can use the heartbeat mechanism to communicate their status and can do so periodically. When a first server receives a heartbeat message from a second server, the first server can determine that the second server is online. When the first server stops receiving heartbeat messages from the second server and a condition has been met (e.g., a threshold period of time has elapsed), then the first server can determine that the second server is offline. In implementations, the client 302 can receive and transmit the heartbeat messages of the distributed file system. The server B 306 can send a heartbeat message to indicate to other servers that it is now online, as on 322 and 324.

When a first server, such as server A 304, receives a heartbeat message from another server, the first server can check metadata (e.g., the report sent by client 302) at 326 to determine if the other server has replicas that may be repaired or healed. In an example, server A 304 receives a heartbeat message from server B 306 at 322, server A 304 checks metadata at 326 and determines that server B 306 has a replica that needs to be repaired or healed. Server A 304 can initiate that repair at 328 by instructing server B 306 to set the replica to an outcast state at 328. At 330, server B 306 sets the outcast state to the replica, such as by setting a bitmap to a unique combination of bits to form an outcast index, as described herein. At 332, the server A 304 performs the repair operation to the replica on server B 306. Once the repair operation is complete, server B 306 can communicate the same to server A 304 at 334. At 336, server B 306 can remove the outcast state. In implementations, the outcast state is removed bit-by-bit. For example, each bit of a bitmap can indicate a pending count of updates the replica missed and/or a particular portion of the replica. As the replica is repaired, the corresponding bit can be updated. Once each portion of the replica is repaired, the bits have also been updated. As the last portion of the replica file is updated, the last remaining bit is updated, thereby removing the outcast state.

Figure 4:
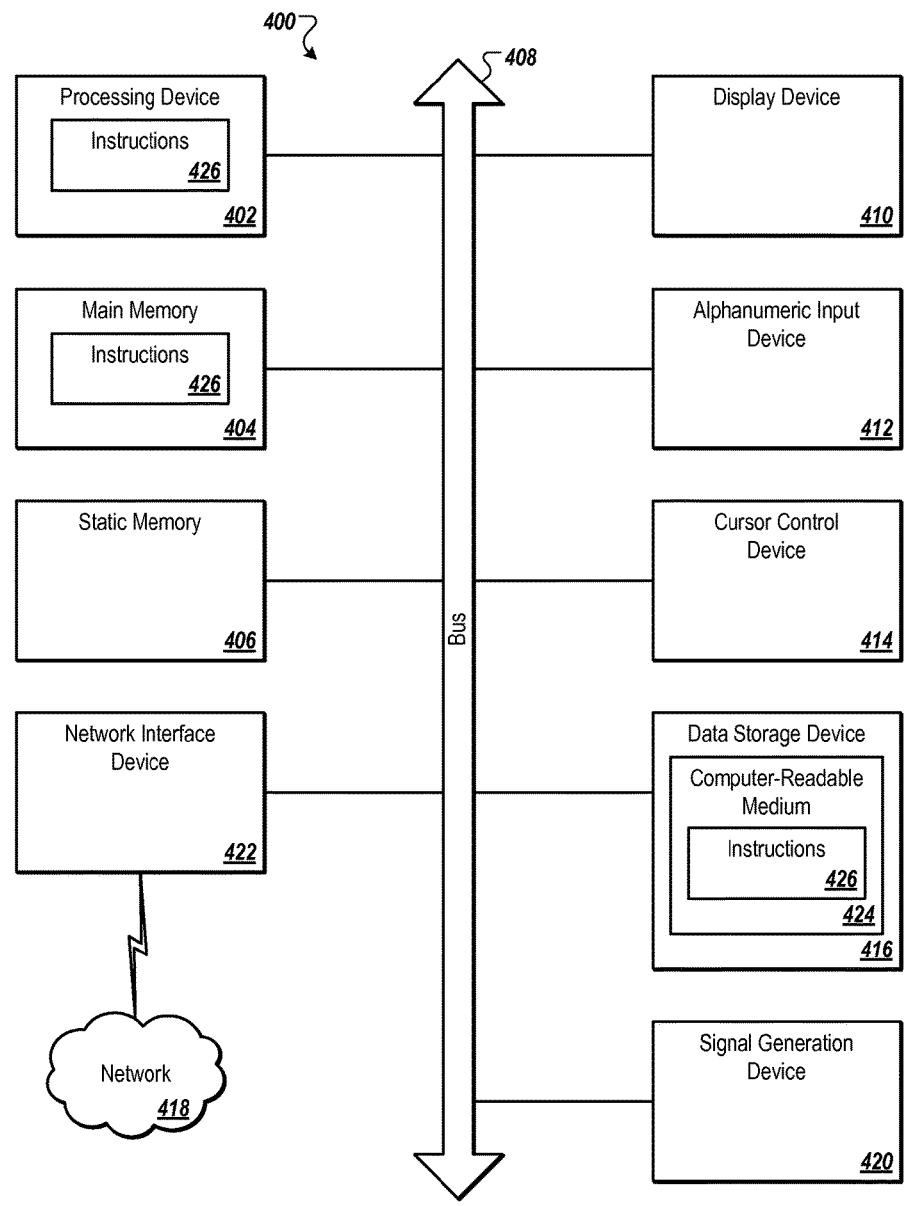
FIG. 4 illustrates an example machine of a computer system within which a set of instructions, for causing the machine to perform any one or more of the methodologies discussed herein, may be executed.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker). The data storage device 416 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions for a pro-active self-healing module and/or a software library containing methods that call modules in a pro-active self-healing module. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
    receiving, by a processing device of a first server, an indication that a first replica stored on the first server is to be modified in view of a second replica stored on a second server, wherein the first replica and the second replica are replicas of a same file, wherein the first server comprises metadata for a plurality of replicas including the first replica and the second replica, wherein the metadata comprises a plurality of bitmaps, wherein each of the plurality of bitmaps is to indicate a state of one replica, wherein each of the plurality of bitmaps comprises a set of bits, wherein each bit in the set of bits corresponds to a pending count of updates the one replica missed;
    updating, by the processing device, a first metadata associated with the first replica to indicate an outcast state of the first replica;
    checking whether the first replica has a pending lock for a modification process to modify the first replica in view of the second replica;
    determining that the modification process is still in progress when the first replica has the pending lock;
    determining that the modification process ended abnormally when the first replica does not have the pending lock and the first metadata indicates the outcast state of the first replica;
    repairing the first replica from a third replica in view of the determining that the modification process ended abnormally; and
    updating the first metadata to remove the outcast state of the first replica in response to an indication that the modification process of the first replica is complete or that the first replica has been repaired.

2. The method of claim 1, wherein the plurality of bitmaps comprises a first bitmap that is associated with the first replica.

3. The method of claim 2, wherein the updating the first metadata comprises setting the set of bits of the first bitmap to a predetermined combination.

4. The method of claim 1, wherein the first server receives the indication that the first replica stored on the first server is to be modified in response to a determination of the second server that the first server went offline and came back online.

5. The method of claim 1, wherein the modification of the first replica is initiated in response to a request of a system administrator.

6. A system, comprising:
    a memory; and
    a processing device, operatively coupled to the memory, the processing device to:
        receive an indication that a first replica stored on a first server is to be modified in view of a second replica stored on a second server, wherein the first replica and the second replica are replicas of a same file, wherein the first server comprises metadata for a plurality of replicas including the first replica and the second replica, wherein the metadata comprises a plurality of bitmaps, wherein each of the plurality of bitmaps is to indicate a state of one replica, wherein each of the plurality of bitmaps comprises a set of bits, wherein each bit in the set of bits corresponds to a pending count of updates the one replica missed;

update a first metadata associated with the first replica to indicate an outcast state of the first replica;

check whether the first replica has a pending lock for a modification process to modify the first replica in view of the second replica;

determine that the modification process is still in progress when the first replica has the pending lock;

determine that the modification process ended abnormally when the first replica does not have the pending lock and the first metadata indicates the outcast state of the first replica;

repair the first replica from a third replica in view of the determination that the modification process ended abnormally; and update the first metadata to remove the outcast state of the first replica in response to an indication that the modification process of the first replica is complete or that the first replica has been repaired.

7. The system of claim 6, wherein the plurality of bitmaps comprises a first bitmap that is associated with the first replica.

8. The system of claim 7, wherein when updating the first metadata, the processing device is to set the set of bits of the first bitmap to a predetermined combination.

9. The system of claim 6, wherein the modification of the first replica is initiated in response to a request of a system administrator.

10. A non-transitory computer readable storage medium including instructions that, when executed by a processing device, cause the processing device to:

receive, by the processing device of a first server, an indication that a first replica stored on the first server is to be modified in view of a second replica stored on a second server, wherein the first replica and the second replica are replicas of a same file, wherein the first server comprises metadata for a plurality of replicas including the first replica and the second replica, wherein the metadata comprises a plurality of bitmaps, wherein each of the plurality of bitmaps is to indicate a state of one replica, wherein each of the plurality of bitmaps comprises a set of bits, wherein each bit in the set of bits corresponds to a pending count of updates the one replica missed;

update, by the processing device, a first metadata associated with the first replica to indicate an outcast state of the first replica;

check whether the first replica has a pending lock for a modification process to modify the first replica in view of the second replica;

determine that the modification process is still in progress when the first replica has the pending lock;

determine that the modification process ended abnormally when the first replica does not have the pending lock and the first metadata indicates the outcast state of the first replica;

repair the first replica from a third replica in view of the determination that the modification process ended abnormally; and update the first metadata to remove the outcast state of the first replica in response to an indication that the modification process of the first replica is complete or that the first replica has been repaired.

11. The non-transitory computer readable storage medium of claim 10, wherein the plurality of bitmaps comprises a first bitmap that is associated with the first replica.

12. The non-transitory computer readable storage medium of claim 11, wherein to update, the first metadata, the processing device is to set a set of bits of the first bitmap to a predetermined combination.

13. The non-transitory computer readable storage medium of claim 10, wherein the first server is to receive the indication that the first replica stored on the first server is to be modified in response to a determination of the second server that the first server went offline and came back online.

14. The non-transitory computer readable storage medium of claim 10, wherein the modification of the first replica is initiated in response to a request of a system administrator.

* * * * *